United States Patent [19]

Beal et al.

[11] Patent Number: 5,377,184
[45] Date of Patent: Dec. 27, 1994

[54] METHOD OF CONTROLLING TWA LINK IN A COMMUNICATIONS ADAPTER BY MONITORING BUFFER FILL LEVELS

[75] Inventors: Peter D. Beal, Endicott, N.Y.; Karlheinz Dutke, Deckenpfronn, Germany; Brian W. Noordyke, Owego; Michael L. Shupert, Vestal, both of N.Y.

[73] Assignee: International Business Machines Corporation, Armonk, N.Y.

[21] Appl. No.: 843,772

[22] Filed: Mar. 2, 1992

[51] Int. Cl.$^5$ ............................................. H04J 15/00
[52] U.S. Cl. ..................................... 370/24; 370/26; 370/31
[58] Field of Search ............ 370/24, 36, 37, 31, 370/32, 84, 94.1, 94.2, 60, 60.1, 61, 29, 108; 375/7, 8; 178/71 R, 71 A, 71 B

[56] References Cited

U.S. PATENT DOCUMENTS

| | | | |
|---|---|---|---|
| 1,264,378 | 4/1918 | Dixon | 178/17 B |
| 3,956,589 | 5/1976 | Weathers et al. | 370/31 |
| 4,368,512 | 1/1983 | Kyu et al. | 364/200 |
| 4,422,171 | 12/1983 | Wortley et al. | 371/32 |
| 4,597,073 | 6/1986 | Staples | 370/24 |
| 4,599,719 | 7/1986 | Breen et al. | 370/24 |
| 4,651,316 | 3/1987 | Kocan et al. | 370/85.7 |
| 4,701,923 | 10/1987 | Fukasawa et al. | 371/41 |
| 4,712,229 | 12/1987 | Nakamura | 379/58 |
| 4,771,417 | 9/1988 | Maxwell et al. | 370/13 |
| 4,796,255 | 1/1989 | Westbrook et al. | 370/100 |
| 4,852,088 | 7/1989 | Gulick et al. | 370/29 |
| 4,924,456 | 5/1990 | Maxwell et al. | 370/32 |
| 5,054,034 | 10/1991 | Hughes-Hartogs | 370/108 |
| 5,179,556 | 1/1993 | Turner | 370/84 |
| 5,245,636 | 9/1993 | Sari et al. | 370/108 |

OTHER PUBLICATIONS

IBM TDB, vol. 34, No. 1, Jun. 1991, "Half-Duplex Wrap Test, Walking-Reset Error-Forcing Techniques", pp. 245–251.
IBM TDB, vol. 33, No. 5, Oct. 1990, "Method For Consistent Data Replication For Collection Management In A Dynamic Partially Conneceted Collection" pp. 454–464.
IBM TDB, vol. 33, No. 5, Oct. 1990, "Only In Chain Full–Duplex LU7 And Increased RU Size", pp. 67–68.
IBM TDB, vol. 32, No. 6A, Nov. 1989, "Method For Forward–Transistive Fully–Connected Collection Management", pp. 341–347.
IBM TDB, vol. 32, No. 3A, Aug. 1989, "Communications 'Port Manager' For Computer Systems", pp. 104–108.
IBM TDB, vol. 26, No. 3B, Aug. 1983, "Multiconfiguration Funnel Circuits", pp. 1507–1511.
IBM TDB, vol. 24, No. 8, Jan. 1992, "Testing of a Half Duplex Communication System", pp. 4116–4118.
IBM TDB, vol. 23, No. 12, May 1981, "Pseudo–Duplex Communications", pp. 5639–5641.
IBM TDB, vol. 21, No. 3, Aug. 1978, "Half–Duplex To Full–Duplex Asychronous Adapter Architecture For Fast Turnaround Data Channels", pp. 1171–1173.
IBM TDB, vol. 20, No. 10, Mar. 1978, "Typewriter With Detached Portable Keyboard", pp. 4250–4251.

Primary Examiner—Douglas W. Olms
Assistant Examiner—Shick Hom
Attorney, Agent, or Firm—Arthur J. Samodovitz

[57] ABSTRACT

A communications adapter interconnects a first device exhibiting a two way alternate (TWA) protocol and a second device exhibiting a two way simultaneous (TWS) protocol. The communications adapter comprises a transmit buffer for storing data received from the first device via a first communication link for transmission to the second device via a second communication link, and a receive buffer for storing data received from the second device via the second communication link for transmission to the first device via the first communication link. Data can be transferred in either direction between the transmit or receive buffer and the first device faster than in the same direction between the transmit or receive buffer and the second device. To optimize the overall transfer rate in both directions between the first and second devices, the second communication link is kept busy in both directions by preventing the receive buffer from filling with data from the second device while the first device transmits data to the transmit buffer, and preventing the transmit buffer from emptying due to reading by the second device while the first device reads data from the receive buffer.

28 Claims, 9 Drawing Sheets

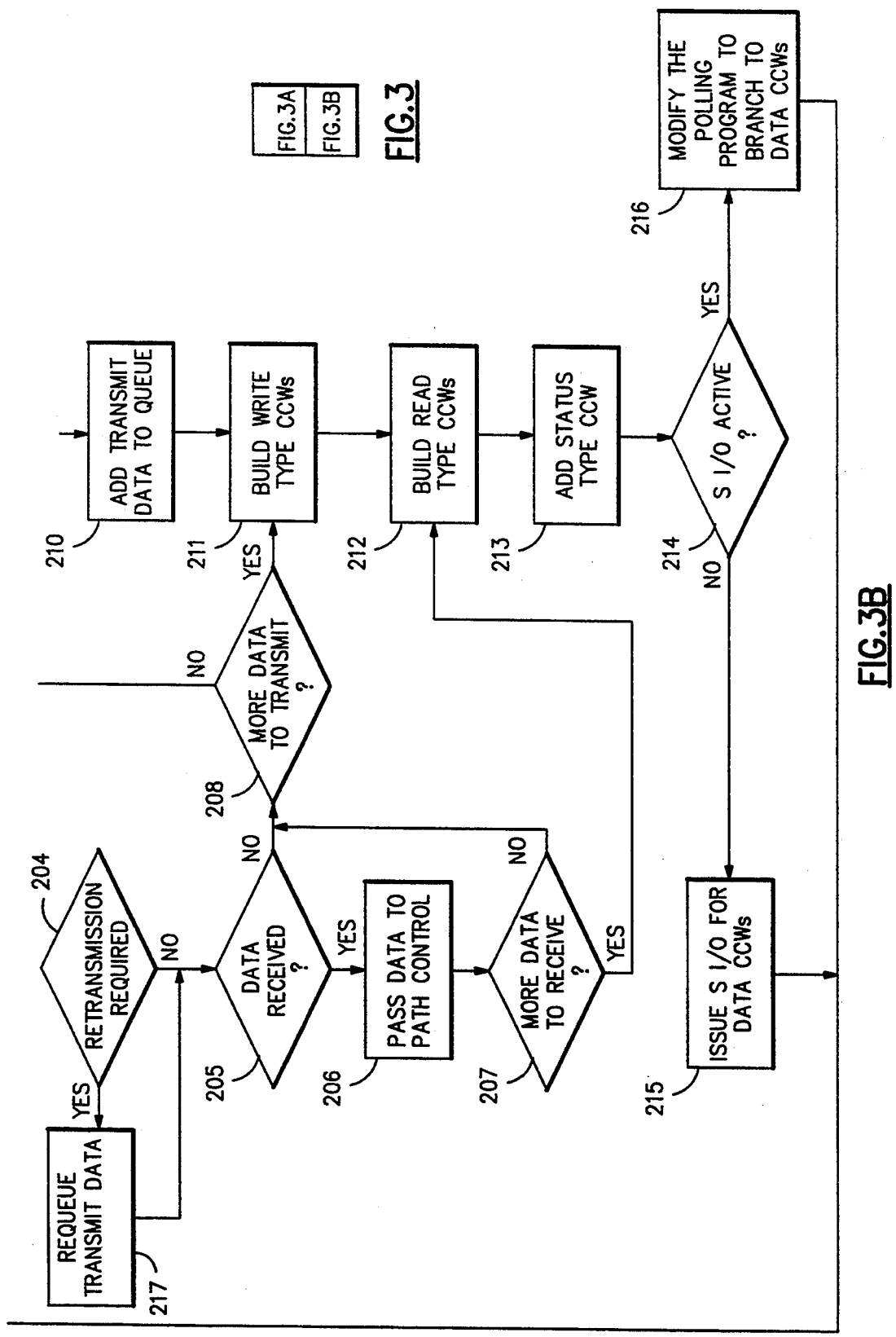

METHOD OF CONTROLLING TWA LINK IN A COMMUNICATIONS ADAPTER BY MONITORING BUFFER FILL LEVELS

The invention relates generally to communications systems, and deals more particularly with a communications adapter between a two way alternate or half duplex communication link and a two way simultaneous or full duplex communication link.

Many communication links operate according to a two way alternate (TWA) or half duplex protocol in which communication can occur in both directions between two devices but at different times. Usually, two separate conductor paths are provided, one for communication in each direction. Other communication links operate according to a two way simultaneous (TWS) or full duplex protocol in which communication can occur in both directions at the same time. Two separate conductor paths are provided, one for communication in each direction. An international standard for both of the TWA and TWS protocols is collectively known as "High Level Data Link Control or HDLC" and a similar IBM standard for both is collectively known as "Synchronous Data Link Control or SDLC". Both of the IBM standards are described in detail in a manual entitled "Synchronous Data Link Control Concepts" which is available from IBM Corp. at Mechanicsburg, Pa. by publication number GA27-3093. Either type of communication protocol can be used between two computers, between one computer and a communications device or between two communications devices.

Some computers such as an IBM System/370 or System/390 computer with a virtual telecommunications access method (VTAM) program exhibit a TWA protocol. It is desirable in some circumstances to permit such a computer (or other device which exhibits a TWA communication protocol) to communicate with another device which exhibits a TWS protocol. In such a case, a communications adapter is required between the two devices.

Typically, the TWA computer transmits and receives data via a bus which is many bits wide whereas the other, TWS device transmits and receives data serially, one bit at a time. Consequently, the TWA computer can usually transmit and receive data at a faster rate than the other, TWS device, can transmit and receive data, respectively.

An object of the present invention is to provide a communications adapter between a first device or communications link which exhibits a TWA protocol and a second device or communications link which exhibits a TWS protocol.

Another object of the present invention is to provide such a communications adapter which maximizes the overall throughput.

Still another object of the present invention is to provide such a communications adapter which does not require changes to either of the devices coupled to it.

SUMMARY OF THE INVENTION

The invention resides in a communications adapter for interconnecting a first device exhibiting a two way alternate (TWA) protocol and a second device exhibiting a two way simultaneous (TWS) protocol. The communications adapter comprises a transmit buffer for storing data received from the first device for transmission to the second device, and a receive buffer for storing data received from the second device for transmission to the first device. The adapter also includes a host interface program and a bus interface for transferring data between the transmit and receive buffers and the first device via a first communication link according to the TWA protocol, and a line interface program and a controller for transferring data between the transmit and receive buffers and the second device via a second communication link according to the TWS protocol.

To optimize the overall transfer rate in both directions between the first and second devices, the second communication link is kept busy in both direction by the following procedure. The fill levels of the transmit and receive buffers are monitored. The transfer of data from the first device to the transmit buffer is halted when the receive buffer fills to a predetermined level even though the first device has additional data to transfer to the transmit buffer, and transfer of data from the receive buffer to the first device is begun. Thus, the receive buffer maintains space to store additional data from the second device. Also, the transfer of data from the receive buffer to the first device is halted when the transmit buffer empties to a predetermined level and transfer of data from the first device to the transmit buffer is begun. Thus, the transmit buffer continues to have data to transmit to the second device.

According to one feature of the present invention, the first communication link is parallel and the second communication link is serial. Thus, data can be transferred in either direction between the transmit or receive buffer and the first device faster than in the same direction between the transmit or receive buffer and the second device. This increases the need for the foregoing optimization procedure.

DETAILED DESCRIPTION OF THE PREFERRED EMBODIMENTS

Figure 1:
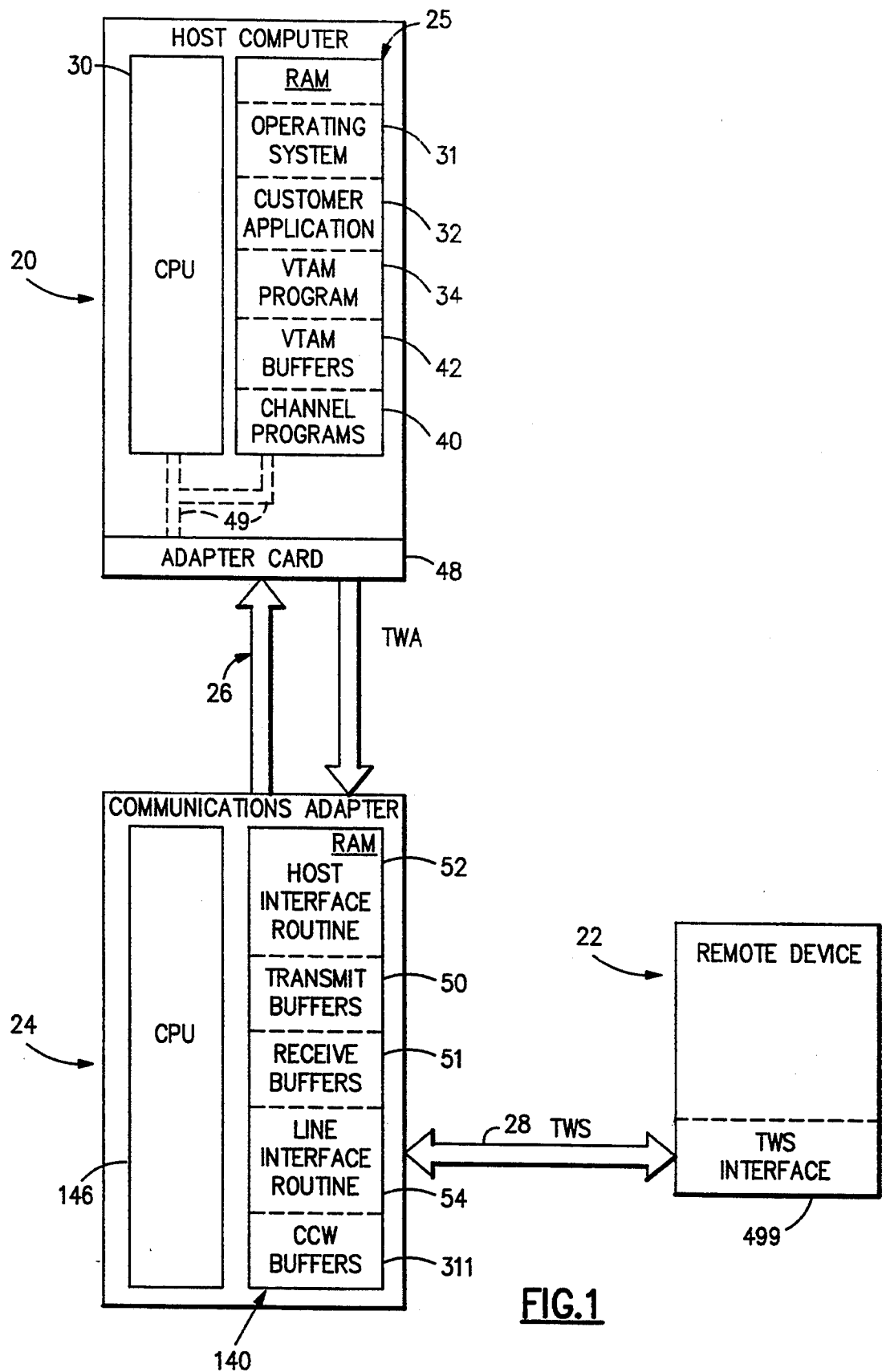
FIG. 1 is a block diagram illustrating a standard host computer including a standard communication link which exhibits a TWA protocol, a standard remote device including a standard communication link which exhibits a TWS protocol, a standard electrical transmission line connected to the communication link of the remote device, and a communications adapter according to the present invention, which adapter is connected between the communication link of the host computer and the transmission line to adapt the two different protocols to each other.

Referring now to the Figures in detail wherein like reference numerals indicate like elements throughout the several views, FIG. 1 illustrates a host computer 20 which exhibits a TWA protocol in accordance with the prior art, a remote computer 22 which exhibits a TWS protocol in accordance with the prior art and a communications adapter 24 in accordance with the present invention. The communications adapter 24 is locally coupled to the host computer 24 via an internal, parallel bus 26 and is remotely coupled to the remote device 22 via a serial transmission line 28 (electrical, optical or satellite). Optionally, the transmission line 28 may include a modem (not shown) at each end. The communications adapter 24 provides an interface between the TWA protocol of the host computer 20 and the TWS protocol of the remote device 22. In the illustrated embodiment, the TWA and TWS protocols are defined by the IBM standards for Synchronous Data Link Control but could also be defined by the similar HDLC or other industry standard.

By way of example, host computer 20 is an IBM System/370 or System/390 computer with a CPU 30 and a VM or VSE operating system 31. A customer application program 32 executes on the CPU 30 and requests to transfer data to remote device 22. The request is in the form of a call to a telecommunications access program 34 which, in the illustrated embodiment, is an IBM virtual telecommunications access method (VTAM) program. The VTAM program is described in more detail in the following documents which are all published by IBM Corp. and available from IBM Corp. at Mechanicsburg, Pa. by the associated order number: "Network Program Products General Information" (GC30-3350), "ACF/VTAM General Information Concepts" (GC27-0463), and "VTAM Diagnosis Reference"(LY30-5582). Chapter 2 of "Network Program Products General Information" is hereby incorporated by reference as part of the present disclosure. In response to the call, VTAM program 34 generates a channel program 40 in accordance with System/370 and System/390 architecture which channel program includes a series of write channel command words (CCWs) to order writing of data from the host computer to the remote device. Each channel command word orders the writing of a block of data so the VTAM program 34 includes enough write CCWs (within a limit) in the channel program to write all the data requested to be written by the customer application program 32. A VTAM buffer space 42 serves as a staging area for the writing of the data from the customer application program 32. The customer application program 32 also requests VTAM program 34 to read data from remote device 22, and in response VTAM program 34 adds read CCWs to the channel program. The channel program ends with a status CCW to request from the communications adapter the status of the write and read operations pursuant to the previous CCWs.

Host computer 20 also includes an adapter card 48 which adapts an internal host system bus 49 exhibiting the System/370 or System/390 architecture to the bus 26 which exhibits a Micro Channel (R) bus architecture. Adapter card 48 includes a buffer which receives the data blocks from the host computer internal bus 49 pursuant to the channel program 40 and provides the data to communications adapter 24 at a time and rate determined by the Micro Channel (R) bus 26 and the communications adapter. Adapter card 48 is described in more detail below and in copending patent application entitled "Interprocessor Buffer Which Receives Data From One Processor At One Rate And Dynamically Packetizes The Data For Transmission To The Other Processor" Ser. No. 07/341,503 filed Apr. 21, 1989 by Clark et. al., now U.S. Pat. No. 5,117,486 which patent is hereby incorporated by reference as part of the present disclosure.

Communications adapter 24 comprises a transmit buffer 50, a receive buffer 51 and other hardware described in detail below. The hardware is publicly available (for more than one year) as IBM Portmaster Adapter/A Hardware, Part Number 53F2604 or 53F2607. The hardware within adapter 24 is also described in an IBM publication entitled "Realtime Interface Co-Processor Portmaster Adapter/A Hardware Technical Reference which is available from IBM Corp. at Mechanicsburg, Pa. by order number S33F-5337, which document is hereby incorporated by reference as part of the present disclosure.

Transmit buffer 50 receives data from the host computer 20 for transmission to the remote device 22, and receive buffer 51 receives data from the remote device 22 for receipt by the host computer 20. Communications adapter 24 is also programmed according to the present invention to adapt the TWA protocol of host computer 20 to the TWS protocol of remote device 22. Accordingly, communications adapter 24 includes a host interface routine 52 to interface to the TWA protocol of the host (or any communications device exhibiting the TWA protocol), and a line interface routine 54 to interface to the TWS protocol of the remote device 22 (or any other communications device exhibiting the TWS protocol). These two routines are described in detail below and each provides a basic and optimizing function.

The basic function of the host interface routine 52 is to control the transfer of data from the host computer 20 to the transmit buffer 50 pursuant to the write CCWs, and the transfer of data from the receive buffer 51 to the host computer 20 pursuant to the read CCWs, both according to the TWA protocol. The basic-function of the line interface routine 54 is to control the transfer of data from the transmit buffer to the remote device, and the transfer of data from the remote device to the receive buffer according to the TWS protocol.

The optimizing function of each routine attempts to make full use of the transmission line 28 in both directions at all possible times for the following reasons. The rate at which data can be sent (in either direction) across bus 26 is much higher than the rate at which data can be sent in one direction across transmission line 28. This is due to the fact that bus 26 is many bits wide (for example 16) whereas transmission line 28 has a single conductor path for each direction. Also, transmission line 28 may have a limited bandwidth. The rate that data can be sent alternately in both directions across internal bus 26 is high enough to fully occupy transmission line 28 with simultaneous transmission in both directions. However, if the host computer 20 were to spend too much continuous time in the transmit mode without intervening operation in the receive mode, the transmit buffer may become full of data from the host computer and this would stop the use of bus 26, or the receive buffer may become full of data from the remote device and this would stop use of the transmission line 28 for receiving data from the remote device. Similarly, if the host computer were to spend too much continuous time in the receive mode without intervening operation in the transmit mode, the receive buffer may become empty and this would stop the use of bus 26 in the receipt mode. Also, the transmit buffer may become empty, and this would stop use of the transmission line 28 for transmitting data to the remote device. Any of these four situations, if allowed to occur, would limit the overall throughput. Consequently, the optimizing portions of the routines monitor the fill level of each buffer, and manipulate the transmit and receive operations of the host computer to avoid filling the transmit buffer 50 or receive buffer 51 beyond predetermined levels, and to avoid emptying the transmit buffer 50 or the receive buffer 51 below predetermined levels. Thus, each time the host computer transmits a block of data to the transmit buffer pursuant to a write CCW, the host interface routine checks the fill level of the transmit buffer and the fill level of the receive buffer, and if both have reached respective predetermined levels, "flushes" the remaining write CCWs in the channel program by quickly responding to VTAM that all of the remaining write CCWs have been executed. Then, the channel program proceeds to the read CCWs. Similarly, each time the host computer reads a block of data from the receive buffer pursuant to a read CCW, the host interface routine checks the fill level of the transmit buffer and the fill level of the receive buffer and if both have fallen to respective predetermined levels, flushes the remaining read CCWs by responding to VTAM that there is no data left to be read. This will permit the channel program to quickly proceed to subsequent write CCWs, if any. The last CCW in the channel program is a status request, and the host interface routine responds to VTAM that the data corresponding to the flushed write CCWs must be resent, and VTAM generates the requisite write CCWs to accomplish this. This process is repeated continuously throughout the communication.

It should be noted that execution of neither routine requires change to the code of VTAM 34 or the communication link of the remote device. While the data is transferred alternately from the host computer 20 to transmit buffer 50 and from the receive buffer 51 to the host computer 20 according to the TWA protocol, data is transferred in both directions simultaneously between the remote device 22 (via transmission line 28) and the transmit and receive buffers 50 and 51 according to the TWS protocol. Assuming neither buffer becomes full or empty, the time of the transmission from the remote device 22 to the receive buffer is determined by the remote device and the time of the transmission from the transmit buffer to the remote device is determined by the line interface routine.

Figure 2:
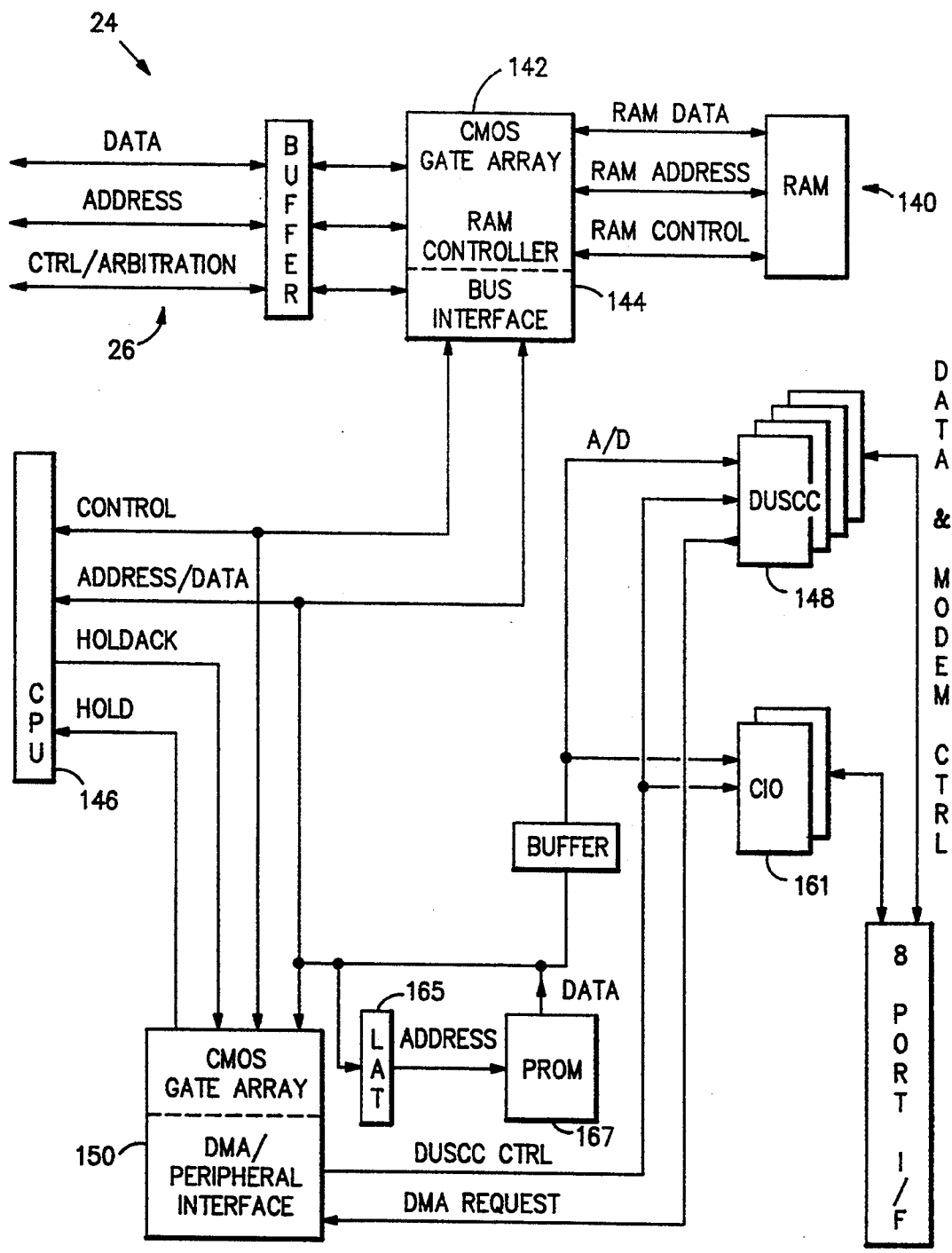
FIG. 2 is a more detailed block diagram of the communications adapter of FIG. 1.

FIG. 2 illustrates the communications adapter 24 in more detail. In addition to transmit buffer 50 and receive buffer 51 which are located in RAM 140, adapter 24 comprises a RAM controller 142 for RAM 140, a bus interface 144 for the Micro Channel (R) bus 26, and a CPU 146 which executes the host interface routine and the line interface routine. The RAM controller 142 and bus interface 144 control at a relatively low level the transfer of data between the transmit and receive buffers 50 and 51 and VTAM 34 via the Micro Channel (R) bus and the adapter card 48. The higher level control is provided by the host interface routine which executes on CPU 146. Communications adapter 24 also includes a dual universal serial communications controller (DUSCC) 148 which provides low level interface to the transmission line 28, i.e. DUSCC 148 provides full duplex channels, SDLC protocol support, NRZ and NRZI data encoding, and CRC checking and generation. Communications adapter 24 also includes a DMA/peripheral interface 150 which provides direct memory access (DMA) to the transmit and receive buffers to transfer data stored therein to and from DUSCC 148. A counter/timer and parallel I/O unit (CIO) 161 provides control leads for the interface to remote device 22. A PROM 163 stores bootstrap and diagnostics programs for the communications adapter, and LAT 165 is an address latch.

Figure 3A:
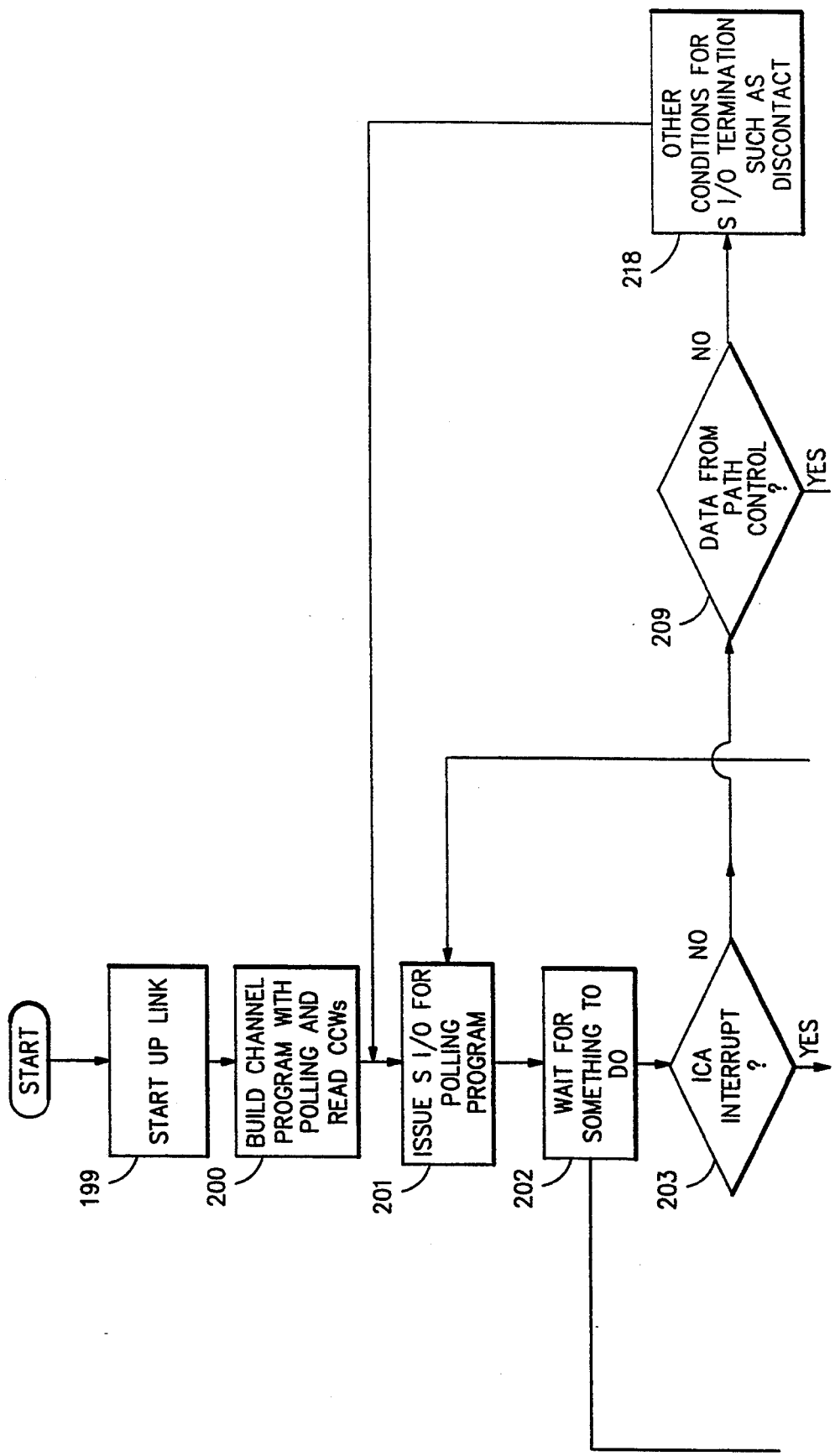
FIG. 3 is a flow chart illustrating the function of a telecommunication access program within the communication link of the host computer of FIG. 1, which program establishes a TWA communication mode.

The following is a more detailed, flow description of the present invention. FIG. 3 is a flow chart illustrating the VTAM program 34. Initially, VTAM starts a communication link with the remote device by sending an open command to the remote device (to which the remote device responds with an acknowledge) (step 199). Next, VTAM builds a channel program comprising, in order, a polling CCW, multiple read CCWs and a status CCW (step 200). Also, VTAM stores a channel address word in a predetermined location in host memory 25. The channel address word identifies a location in host memory that begins the channel program. Then, VTAM issues a start I/O to the communications adapter 24 (step 201), and then waits for either a response from the communications adapter or a command from the host application program 32 (step 202).

Figures 4, 4A:
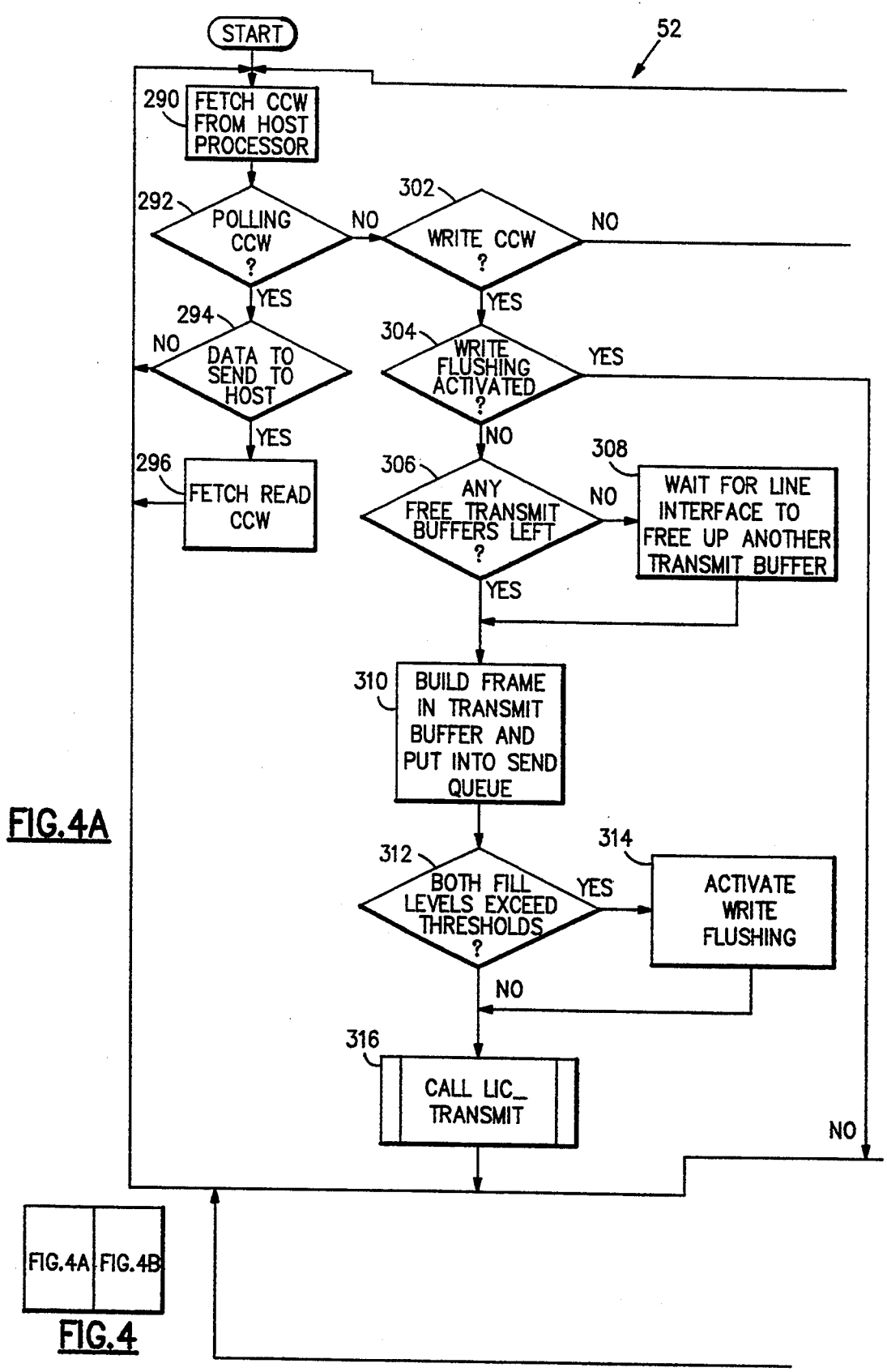
FIG. 4 is a flow chart illustrating a TWA host interface routine of a computer program executed by the communications adapter of FIG. 1.
Figure 4B:
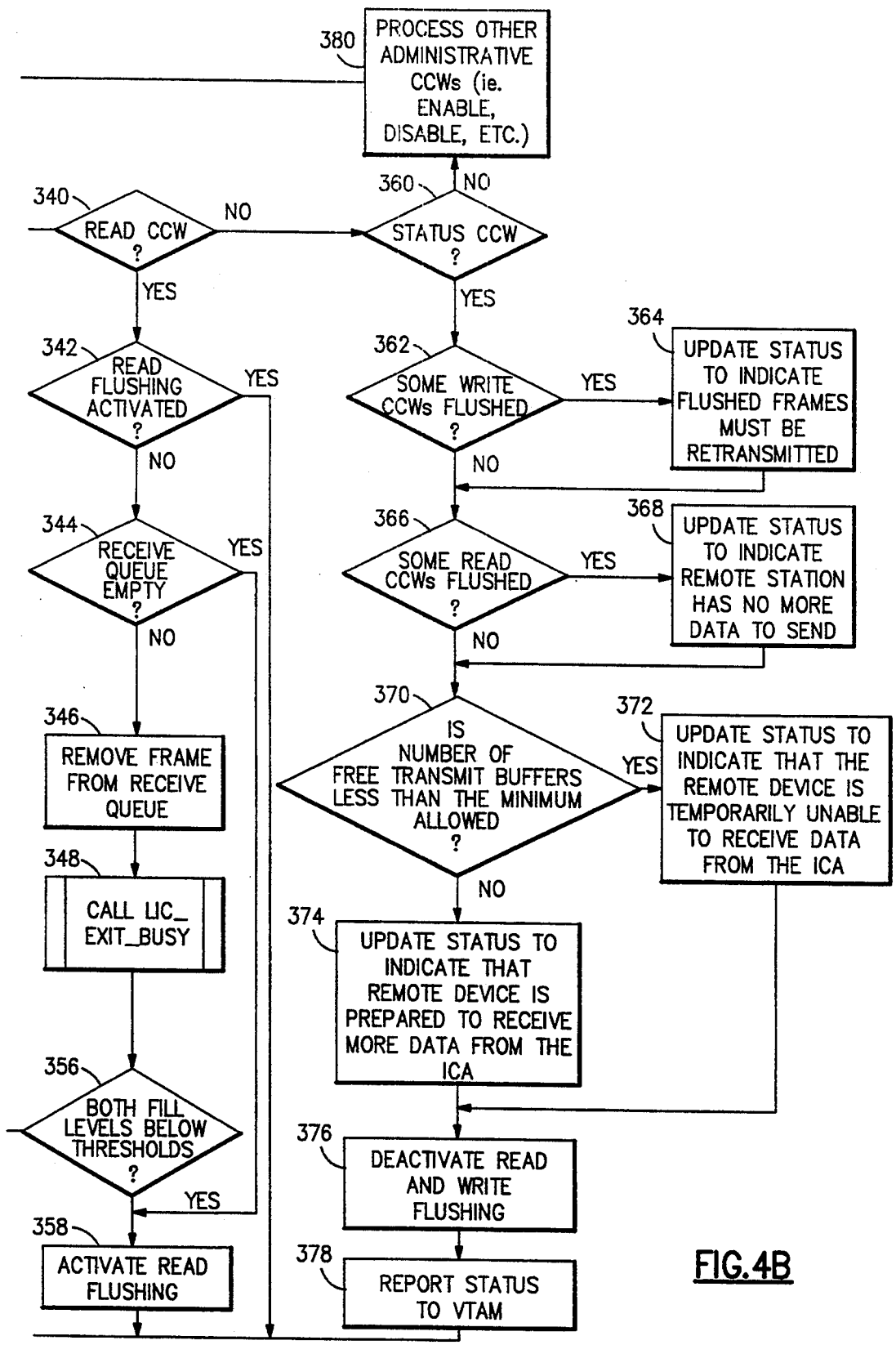

In response to the start I/O, the bus interface 144 interrupts the host interface routine, and the host interface routine directs the bus interface 144 to fetch the first channel command word in the channel program. In response, the bus interface requests the next CCW from the adapter card 48, and the adapter card 48 obtains the CCW from the host memory, stores the data in a buffer within the adapter card 48 and makes the data available to the Micro Channel (R) bus. Then, the bus interface 144 fetches the data from the adapter card, and the RAM controller 142 writes the data into a CCW buffer 311. Then, the bus interface notifies the CPU 146 that the CCW has been obtained from the host computer, and the host interface routine begins to execute the CCW (step 290 of FIG. 4). The first channel command word is a polling command (decision block 292) which notifies the communications adapter (although it was intended by VTAM to notify the remote device) that the communications adapter can now transfer data to VTAM. This polling is required by the TWA protocol of the host computer to ensure that both the host computer and its partner do not try to transfer data at the same time. If the communications adapter has no data to send (decision block 294), the host interface routine directs the bus interface to fetch the next CCW. However, if the communications adapter has data to send to the host computer, the host interface routine directs the bus interface to fetch a subsequent read CCW from the channel program (step 296). Then, the bus interface fetches the read CCW (step 290) and processes it (in the same manner that it processes any subsequent read CCW). After determining that the current CCW is a read CCW (decision blocks 302 and 340), the host interface routine determines if a read CCW flushing indicator has been set (decision block 342). Such an indicator is set when the fill levels of the transmit buffer 50 and the receive buffer 51 have both fallen to respective predetermined levels, for example, 12% of capacity of each. The fill level of each buffer is measured by counting the amount of data that is added to the buffer and subtracting the amount of data that is read out of the buffer. If the fill levels of both buffers are below the predetermined levels, the read CCW is flushed, i.e. not processed by the communications adapter. The reason for flushing the read CCW is to proceed quickly to a subsequent write CCW before the transmit buffer 50 becomes empty because in such a case, there would be no data to send over the transmission line 28 and the overall transfer rate or throughput would be reduced. However, if the read CCW flush indicator has not been set, the host interface routine proceeds to determine if the receive buffer 51 is empty (decision block 344). If so, then there is no data to send to the host, the read flushing indicator is set (step 358) and this read CCW is not processed further. However, if there is a frame of data in the read buffer, then it is sent to the host computer (step 346) in the following manner.

When the data arrived at the communications adapter from the remote device 22 for transmission to host computer 20, the line interface routine wrote control information into the registers within DUSCC 148 and DMA/peripheral Interface 150. The control information indicated the nature of the communication link to the remote device, i.e. TWS, the direction of the communication, a description of control lead handshaking, a linkage between DUSCC 148 and DMA/Peripheral interface 150 and a requirement to send an interrupt to the line interface routine at the end of each data frame. Then, the line interface routine directed the DMA/Peripheral interface 150 to DMA the data into a specific location in the receive buffer 51.

Subsequently, when the CPU 146 executes step 346, CPU 146 notifies the bus interface where the data is located in the receive buffer and directs the bus interface 144 to send the data to the adapter card 48 via the Micro Channel (R) bus 26. After bus interface 144 completes the transfer to the adapter card 48, the bus interface notifies the CPU, and the CPU sends an interrupt to VTAM at step 202.

Figure 6:
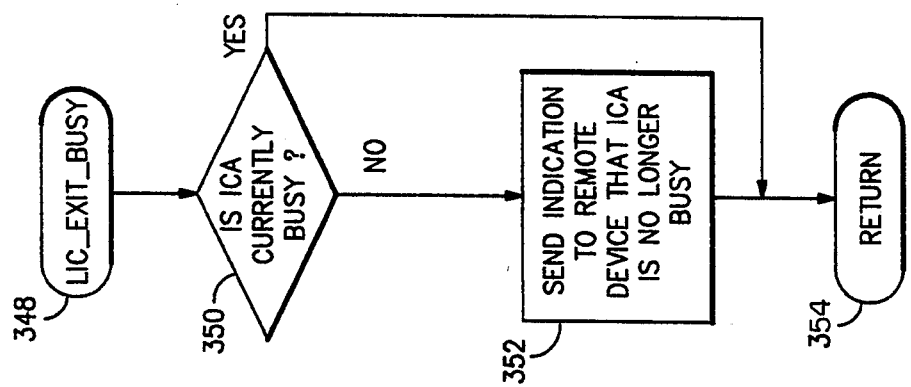
FIG. 6 is a flow chart of an exit busy subroutine of the line interface routine of the computer program executed by the communications adapter of FIG. 1.

Then, the host interface routine calls a line interface exit busy subroutine at step 350 of FIG. 6. The purpose of this call is as follows. It was possible that before this last frame was sent from the receive buffer 51 to the host computer that the receive buffer was full. In such a case, the communications adapter would have notified the remote device that it was busy and could not receive any more data from the remote device. The call to the exit busy line interface subroutine checks if the communications adapter is in this busy state (decision block 350) and if so, resets the busy indicator and notifies the remote device that the communications adapter is no longer busy (step 352). Then the line interface exit busy subroutine returns to the host interface routine at decision block 356 and the host interface routine determines if the fill levels of the transmit and receive buffers have fallen below their respective predetermined levels. If both fill levels have fallen below their respective predetermined levels, the host interface routine sets the read CCW flush indicator (step 358). Then, the host interface routine loops back to step 290 to read the next CCW.

Additional read CCWs are read and processed as above as long as there is data stored in the receive buffer; however, if the read flushing indicator becomes set, then decision block 342 causes a flushing of the current read CCW. When the read flushing indicator is set, the subsequent read CCWs, if any, are also flushed, and eventually the status CCW is fetched by the bus interface interface and read by the host interface routine.

When the bus interface fetches the status CCW, then decision blocks 302, 340 and 360 lead to decision block 362 in which the host interface routine determines whether one or more of the preceding write CCWs were flushed. In which case, the status is updated to indicate that the data corresponding to the flushed write CCWs must be resent (step 364). Next, the host interface routine determines whether one or more read CCWs were flushed (decision block 366), and if so, updates the status to indicate that the remote device has no more data to send at the moment and that the data sent to the host before the read flushing began was all the data that was sent from the remote station (step 368). Next, the host interface routine determines if the transmit buffer 50 is filled beyond the predetermined level (decision block 370), and if so, updates the status to indicate that the remote device is temporarily unable to receive data from the host (step 372). This is another safeguard to prevent overflow of the transmit buffer. If the transmit buffer is not so filled, then the host interface routine updates the status to indicate that the remote device is capable of receiving more data. Next, the host interface routine resets the write CCW flush indicator and the read CCW flush indicator (step 376). This is appropriate because the status as updated in steps 368 and 372 provides the safeguard against overflow of the transmit buffer. In step 378, the host interface routine reports the status to VTAM with an interrupt at step 202.

In response to the interrupt from the communications adapter following the execution of each CCW by the communications adapter (decision block 203), VTAM determines if data must be re-transmitted (based on the response to the status CCW) (decision block 204). Such data would have been transmitted during a previous write CCW (assuming there was one) and flushed. If re-transmission is required, then VTAM re-queues the data for subsequent re-transmission (step 217). Next, VTAM determines if data was received from the communications adapter during execution of the most recent channel program (decision block 205). If so, VTAM passes the data to the host application program 32 (step 206).

It is possible that the communications adapter has other data to send to the host, and VTAM will learn this from the status CCW (decision block 207). This other data could have been present in the communications adapter at the time that the most recent channel program was executed but there were an insufficient number of read CCWs to read all of this data. If there is more data to send to the host, VTAM builds additional read CCWs with the address of the host memory to receive this additional data (step 212) and adds a status CCW at the end of the read CCWs to cause the communications adapter to report the status of the read operation after executing the additional read CCWs (step 213). Next, VTAM determines in decision block 214 that the start I/O which was issued in step 201 is no longer active (because it ended in decision block 203 when the communications adapter completed execution of the most recent channel program) and then issues a new start I/O (step 215) and loops back to step 202.

Referring back to decision block 207, if the communications adapter had no more data to send to the host computer, then decision block 207 leads to decision block 208 in which VTAM determines if there is data in the transmit queue to send to the remote device. If there is no such data to send, VTAM loops back to step 201. However, if there is such data to send, then VTAM builds additional write CCWs for the channel program and then executes steps 212-215 as described above. Additional read CCWs are added in step 212 because it is possible that the remote device will want to respond to the transmission from the host.

When the application program has new data to send to the remote device, the application program will notify VTAM at step 202. Because this notification emanates from the application program, decision block 203 leads to decision block 209 in which VTAM determines that the host has data to transmit. Then, VTAM adds the data to a transmit queue (step 210), builds write CCWs for the channel program (step 211) to permit transmission of the host data, builds read CCWs for the channel program after the write CCWs (step 212) in case the remote device has a response to the data, and builds a status CCW (step 213) to cause the communications adapter to report the result of execution of the read and write CCWs. Next, VTAM determines if the start I/O is still active (decision block 214). If the start I/O is still active, VTAM modifies the polling program to branch to the write CCWs (step 216). If the start I/O has ended, VTAM issues another start I/O to the host interface routine (step 215).

CPU 146 directs the bus interface interface to fetch the next CCW, which in this case is a write CCW. Then the host interface routine reads the CCW in step 290 and determines that it is a write CCW in step 302. Next, the host interface routine determines if there is an indication in RAM 140 to flush the next write CCW due to the transmit buffer 50 and the receive buffer 51 being full to respective predetermined levels (decision block 304). The purpose of flushing the write CCW in such a case is to proceed quickly to a subsequent read CCW so that the transmit buffer 50 is not overfilled by this CCW and so that the receive buffer 51 can be emptied by the host computer before it is completely filled. (As noted above, if the receive buffer were to become completely full, the line interface code would notify the remote device to stop sending data and this would reduce the overall utilization and should be avoided). If the indicator has been set, then the host interface routine loops back to step 300 to read the next CCW, if any. However if the write flushing indicator has not been set, the host interface routine checks to determine if there is any available space in the transmit buffer 50 (decision block 306). If not, the host interface routine waits for the next block of data to be transmitted to the remote device under control of the line interface code (which is being executed concurrently using a multitasking operating system and is described in more detail below) (step 308). Such a transfer will provide space in the transmit buffer for the new data from the host computer. After such a transfer or if there was space available, the host interface routine directs the bus interface 144 to read a block of the data corresponding to the write CCW into the transmit buffer (step 310) in the following manner.

CPU 146 directs the bus interface to pass a request for the data over the Micro Channel (R) bus 26 and notifies the bus interface interface 144 where to store the data in the transmit buffer 50. In response, the bus interface requests the data from the adapter card 48, and the adapter card 48 obtains the data from the host memory, stores the data in a buffer within the adapter card 48 and makes the data available to the Micro Channel (R) bus. Then, the bus interface 144 fetches the data from the adapter card, and the RAM controller 142 writes the data into the transmit buffer 50. Then, the bus interface notifies the CPU 146 that the data has been obtained from the host computer.

The data fetched from the host computer at this time is in SDLC format (and this same format is used for subsequent transmission to the remote device; it is the alternate or simultaneous manner of transmission of the data that establishes TWA or TWS mode of communication).

Figure 5:
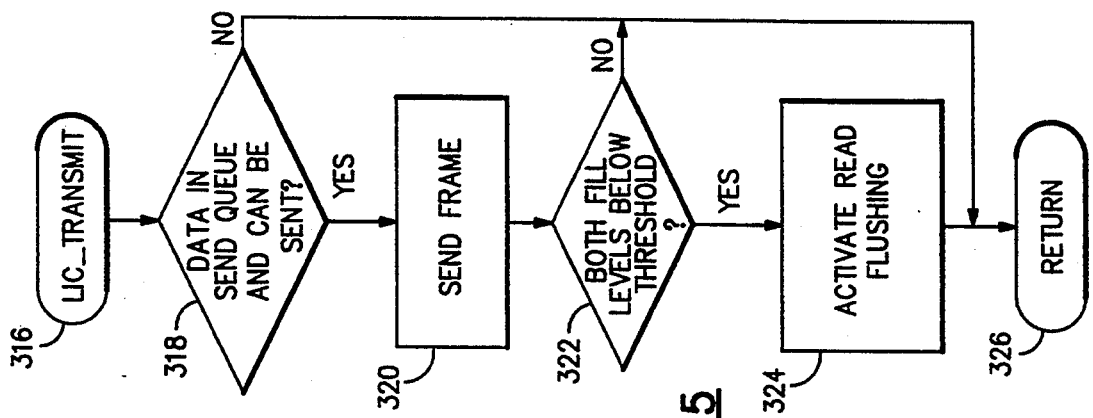
FIG. 5 is a flow chart of a transmit subroutine of a line interface routine of the computer program executed by the communications adapter of FIG. 1.

After the data is written into the transmit buffer, the host interface routine determines if the respective predetermined thresholds for the transmit and receive buffers have been exceeded (for the purpose of setting the write CCW flush indicator) (decision block 312), and if both have been exceeded, sets the indicator (step 314). If both thresholds have not been exceeded on after step 314, the host interface routine calls a line interface transmit subroutine at step 318 (step 316) (FIG. 5).

In step 318, the line interface transmit subroutine determines that there is a frame of data in transmit buffer 50 ready to be sent, and then sends the frame (step 320) in the following manner. The line interface routine writes control information to registers within DUSCC 148 and registers within DMA/Peripheral Interface 150. The control information indicates the nature of the communication link to the remote device, i.e. TWS, the direction of the communication, a description of control lead handshaking, a linkage between DUSCC 148 and DMA/Peripheral Interface 150 and a requirement to send an interrupt to the line interface routine at the end of each data frame. The DMA/Peripheral interface 150 DMAs the data and supplies it to DUSCC 148. Then, DUSCC 148 serially shifts the data bytes to transmission line 28 in accordance with TWS protocol. Because the communication to the remote device is TWS, the line interface subroutine does not check to determine if there is incoming data from the remote device before sending the frame.

Next, the line interface transmit subroutine determines if the fill level of both buffers are below the predetermined level (for the purpose of flushing subsequent read CCWs) (decision block 322), and if so, sets the indicator (step 324). Then, the line interface subroutine returns to its caller, the host interface routine (step 316).

Figure 7:
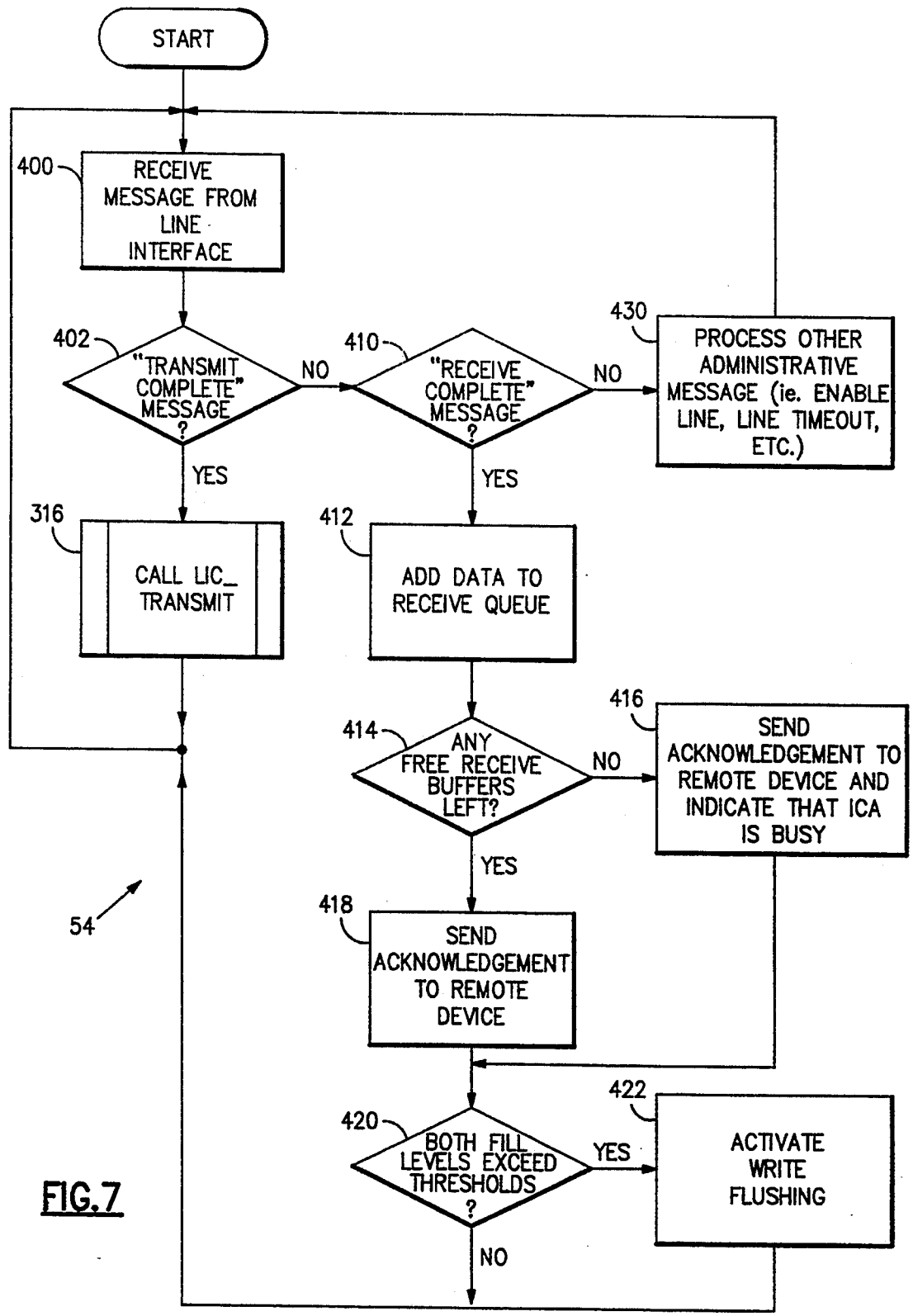
FIG. 7 is a flow chart illustrating the remainder of the line interface routine of the computer program executed by the communications adapter of FIG. 1.

FIG. 7 illustrates the remainder of the line interface routine 54. After a block of data has been sent to the remote device, the DMA/Peripheral interface 150 sends an interrupt/message to the CPU 146 (step 400). Assuming the message indicates that transmission of the data block to the remote device was successful (decision block 402), the line interface routine calls the line interface transmit subroutine to transmit the next block of data to the remote device as described above (steps 318-324). After the return to the line interface routine, the line interface routine is ready to receive the next message from the hardware.

Data is also received by DUSCC 148 from the remote device under the control of the DMA/Peripheral interface 150. After a block of data is received, the DMA/Peripheral interface sends an interrupt/message to the CPU. When the message is received, it is read in step 400. Assuming the message indicates that a block of data has been received from the remote device (decision blocks 402 and 410), the data is queued in the receive buffer 51 (step 412). Next, the line interface routine determines if the receive buffer 51 is completely filled (decision block 414), and if so, sends a message to the remote device acknowledging receipt of the block of data and indicating that the communications adapter 24 is busy and therefore cannot receive any more data at the moment (step 416). (As described above, the exit busy subroutine in steps 350-352 can send a contrary message to the remote device after a data block is sent from the receive buffer 51 to the host computer.) However, if the receive buffer 51 is not completely full, then the message indicates only that the data block has been received (step 418). Next, the line interface routine determines if the receive buffer is now full to the predetermined level (decision block 420), and if so, sets the write CCW flush indicator (step 422).

Now the line interface routine is ready to receive another message, which can be another transmission complete or reception complete message as described above or an administrative message such as an enable line message which indicates a physical connection to the remote device should be established or a line time-out message which indicates that a protocol timer has expired (step 430).

Figure 8:
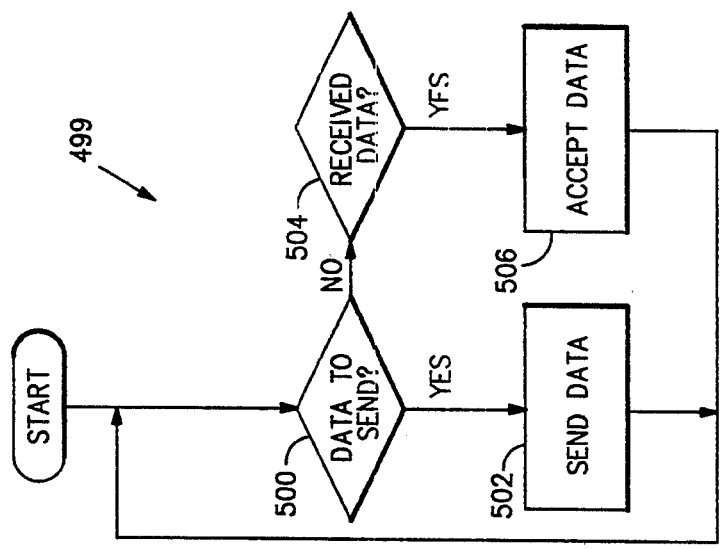
FIG. 8 is a flow chart illustrating a TWS mode of communication from and to the remote device of FIG. 1.

FIG. 8 is a flow chart illustrating the operation of the remote device 22 with a TWS or full duplex interface 499. By way of example, remote device 22 is an IBM 3745 communication controller which is further described in a document entitled "IBM 3745 Models 210, 310, 410 and 610 Introduction" published by IBM Corp. and available from IBM at Mechanicsburg, Pa. by order number GA33-0092. However, communications adapter 24 can be used with any remote device which exhibits the TWS protocol. As noted above, the mode of operation of remote device 22 is to send data when it has data to send and the destination is not busy and to receive data when the data is incoming (and when the remote device is not busy). Thus, in decision block 500, the remote device (code or hardware) determines if the remote device has data to send, and if so, sends the data in a frame with the SDLC format (Step 502). Then, when there is incoming data, the remote device detects this in decision block 504, and accepts the data for storage if the remote device has room for the data (step 506). The received data has the form of an SDLC frame.

The VTAM flow chart also illustrates a step 218 in which VTAM is notified by the application program for a reason other than reading or writing data such as discontact, a condition that requires termination of the start I/O.

Figure 9:
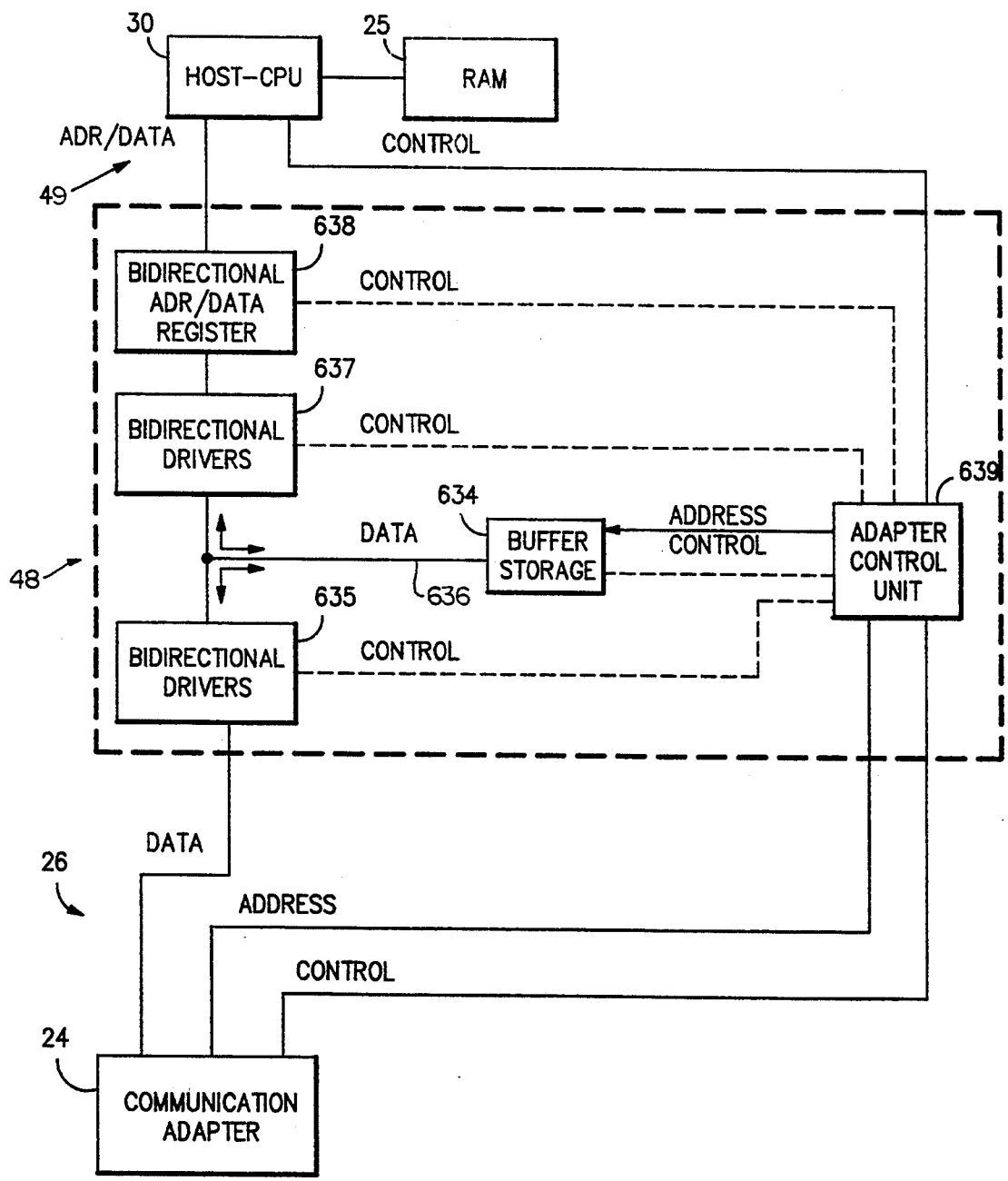
FIG. 9 is a block diagram of a bus to bus adapter within the communication link of the host computer.

FIG. 9 further illustrates the adapter card 48. Adapter card 48 includes a buffer storage unit 634 for storing data supplied by either one of the data processors 30 and 146 and for transferring such data to the other one of the data processors 146 and 30. The data flow path from the processor 146 to the buffer storage 634 is by way of microchannel bus 26, bidirectional drivers 635, and buffer data bus 636. The data transfer path between the buffer storage 634 and the host processor 30 is provided by buffer data bus 636, bidirectional drivers 637, bidirectional address/data register 638 and the host address/data bus 49. Both of these data flow paths are bidirectional in nature. Data and messages may flow from the host processor 30 to the buffer storage 634 or vice versa. Similarly, data and messages may flow from the processor 146 to the buffer storage 634 or vice versa.

Data or messages are never allowed to flow directly from the host processor 30 to the processor 146 or vice versa. All messages and all data are first stored in the buffer storage 634 and then read out and supplied to the other processor. The two sets of bidirectional drivers 635 and 637 are never both active at the same time. If bidirectional drivers 635 are turned on for data transfer purposes, then bidirectional drivers 637 are turned off and vice versa.

One reason for using the buffer storage 634 as an intermediary is the fact that the host bus 49 has a considerably different architecture than the Micro Channel (R) bus. They have different numbers of data lines, different operating cycle requirements, etc. Thus, it is necessary to reformat or reorganize the data before sending it on to the next data processor.

Adapter card 48 also includes an adapter control unit 639 for controlling the operation of the other units in the adapter card. The adapter control unit 639 controls the addressing and read verses write (R/W) status of the buffer storage 634. It also controls the operational status and flow direction of the bidirectional drivers 635 and 636 and the address/data register 638. The adapter control unit 639 receives appropriate control signals from the host processor 30 via host bus 49 and from the processor 146 via the Micro Channel (R) bus 26. It also receives address information from the processor 146 via the Micro Channel (R) bus 26.

Based on the foregoing, a communications adapter according to the present invention has been disclosed. However, numerous modifications and substitutions can be made without deviating from the scope of the present invention. For example, the inventive principles of the communications adapter including the optimizations to ensure full utilization of the transmission line 28 in both directions can be used to provide an interface between other types of TWA devices (that do not use a channel program) and other types of TWS remote devices. Also, to avoid overflow of the receive buffer 51, transmission of data from host computer 20 to the transmit buffer 50 can automatically be halted after a predetermined time (using a timer and by flushing remaining write CCWs) and reading begun. Similarly, to avoid emptying of the transmit buffer 50, reading of data from the receive buffer by host computer 20 can be automatically halted after a predetermined time (by using a timer and flushing remaining read CCWs) and transmitting begun. In this alternate embodiment of the present invention, it is not necessary to monitor the fill levels of the transmit buffer or receive buffer. Therefore, the invention has been disclosed by way of illustration and not limitation, and reference should be made to the following claims to determine the scope of the present invention.

We claim:

1. A communications adapter for interconnecting a first device exhibiting a two way alternate protocol and a second device exhibiting a two way simultaneous protocol, said communications adapter comprising:
    a transmit buffer for storing data received from said first device for transmission to said second device;
    a receive buffer for storing data received from said second device for transmission to said first device;

first means for transferring data between said transmit and receive buffers and said first device via a first communication link according to said two way alternate protocol;

second means for transferring data between said transmit and receive buffers and said second device via a second communication link according to said two way simultaneous protocol; and means, responsive to a fill level of said receive buffer, for controlling the first transferring means to halt transfer of data from said first device to said transmit buffer before said receive buffer fills with data from said second device, even though said first device has additional data to transfer to said transmit buffer, and transfer data from said receive buffer to said first device to make room in said receive buffer for additional data from said second device.

2. A communications adapter as set forth in claim 1 wherein said first communication link comprises a multi-bit bus.

3. A communications adapter as set forth in claim 2 wherein said second communication link comprises a transmission line which serially carries data one bit at a time in each direction.

4. A communications adapter as set forth in claim 1 further comprising means for monitoring a fill level of said receive buffer and wherein the controlling means halts the transfer of data from said first device to said transmit buffer when said receive buffer fills to a predetermined level.

5. A communications adapter as set forth in claim 1 wherein said second transferring means comprises means, responsive to receipt of data from said first device, for initiating transfer of said data to said second device.

6. A communications adapter as set forth in claim 1 wherein said first transferring means is capable of transferring data faster in one direction between said transmit or receive buffer and said first device than said second transferring means is capable of transferring data in one direction between said transmit or receive buffer and said second device.

7. A communications adapter for interconnecting a first device exhibiting a two way alternate protocol and a second device exhibiting a two way simultaneous protocol, said communications adapter comprising:

a transmit buffer for storing data received from said first device for transmission to said second device;

a receive buffer for storing data received from said second device for transmission to said first device;

first means for transferring data between said transmit and receive buffers and said first device via a first communication link according to said two way alternate protocol;

second means for transferring data between said transmit and receive buffers and said second device via a second communication link according to said two way simultaneous protocol; and means, responsive to a fill level of said transmit buffer, for controlling the first transferring means to halt transfer of data from said receive buffer to said first device before said transmit buffer empties due to transfer of data from said transmit buffer to said second device, even though said receive buffer has additional data to transfer to said first device, and transfer data from said first device to said transmit buffer to prevent emptying of said transmit buffer.

8. A communications adapter as set forth in claim 7 wherein said first communication link comprises a multi-bit bus.

9. A communications adapter as set forth in claim 8 wherein said second communication link comprises a transmission line which serially carries data one bit at a time in each direction.

10. A communications adapter as set forth in claim 7 wherein said first transferring means is capable of transferring data faster in one direction between said transmit or receive buffer and said first device than said second transferring means is capable of transferring data in one direction between said transmit or receive buffer and said second device.

11. A communications adapter as set forth in claim 7 wherein said second transferring means comprises means, responsive to receipt of data from said first device, for initiating transfer of said data to said second device.

12. A communications adapter as set forth in claim 7 further comprising means for monitoring a fill level of said transmit buffer, and wherein the halting means halts the transfer of data from said receive buffer to said first device when said transmit buffer empties to a predetermined level.

13. A communications adapter as set forth in claim 7 wherein said second transferring means receives data from said second device at the request of said second device.

14. A communications adapter for interconnecting a first device exhibiting a two way alternate protocol and a second device exhibiting a two way simultaneous protocol, said communications adapter comprising:

a transmit buffer for storing data received from said first device for transmission to said second device;

a receive buffer for storing data received from said second device for transmission to said first device;

first means for transferring data between said transmit and receive buffers and said first device via a first communication link according to said two way alternate protocol;

second means for transferring data between said transmit and receive buffers and said second device via a second communication link according to said two way simultaneous protocol;

means for monitoring a fill level of said transmit buffer;

means for monitoring a fill level of said receive buffer;

first means, responsive to fill levels of said transmit and receive buffers, for controlling the first transferring means to halt transfer of data from said first device to said transmit buffer when said transmit buffer and said receive buffer fill to respective predetermined levels even though said first device has additional data to transfer to said transmit buffer, and transfer data from said receive buffer to said first device, whereby said receive buffer maintains enough space to store additional data from said second device; and second means, responsive to fill levels of said transmit and receive buffers, for controlling the first transferring means to halt transfer of data from said receive buffer to said first device when said receive buffer and said transmit buffer empty to respective predetermined levels and transfer data from said first device to said transmit buffer, whereby said transmit buffer continues to have enough data to transmit to said second device.

15. A communications adapter as set forth in claim 14 wherein said first communication link comprises a multi-bit bus.

16. A communications adapter as set forth in claim 15 wherein said second communication link comprises a transmission line which serially carries data one bit at a time in each direction.

17. A communications adapter as set forth in claim 14 wherein said first transferring means is capable of transferring data faster in one direction between said transmit or receive buffer and said first device than said second transferring means is capable of transferring data in one direction between said transmit or receive buffer and said second device.

18. A communications adapter as set forth in claim 14 wherein said second transferring means comprises means, responsive to receipt of data from said first device, for initiating transfer of said data to said second device.

19. A communications adapter as set forth in claim 18 wherein said first transferring means transfers data received from said second device to said first device in response to a read command received from said first device.

20. A communications adapter as set forth in claim 19 wherein said second transferring means receives data from said second device at the request of said second device.

21. A first system for processing data and communicating with a second system exhibiting a two way simultaneous communication protocol, said first system comprising:
 a processor for processing data;
 means, coupled to said processor, for communicating according to a two way alternate protocol; and
 a communications adapter, coupled to the communicating means, comprising
  a transmit buffer for storing data received from said communicating means, for transmission to said second system;
  a receive buffer for storing data received from said second system for transmission to said communicating means;
  first means for transferring data between said transmit and receive buffers and said communicating means via a first communication link according to said two way alternate protocol;
  second means for transferring data between said transmit and receive buffers and said second system via a second communication link according to said two way simultaneous protocol;
  means, responsive to a fill level of said receive buffer, for controlling the first transferring means to halt transfer of data from said communicating means to said transmit buffer before said receive buffer fills with data from said second system, even though said communicating means has additional data to transfer to said transmit buffer, and transfer data from said receive buffer to said communicating means to make room in said receive buffer for additional data from said second system; and
  means, responsive to a fill level of said transmit buffer, for controlling the first transferring means to halt transfer of data from said receive buffer to said communicating means before said transmit buffer empties due to transfer of data from said transmit buffer to said second system, even though said receive buffer has additional data to transfer to said communicating means, and transfer data from said communicating means to said transmit buffer to prevent emptying of said transmit buffer.

22. A method for interconnecting a first device exhibiting a two way alternate protocol and a second device, said method comprising the steps of:
 transferring data from said first device to a transmit buffer via a first communication link according to said two way alternate protocol;
 transferring data from said second device to a receive buffer via a second communication link; and
 monitoring a fill level of said receive buffer and when said receive buffer fills to a predetermined level less than full capacity, halting transfer of data from said first device to said transmit buffer, even though said first device has additional data to transfer to said transmit buffer, and transferring data from said receive buffer to said first device via said first communication link to make room in said receive buffer for additional data from said second device.

23. A method as set forth in claim 22 further comprising the step of halting transfer of data from said receive buffer to said first device before said transmit buffer empties due to transfer of data from said transmit buffer to said second device, even though said receive buffer has additional data to transfer to said first device, and transferring data from said first device to said transmit buffer via said two way alternate protocol to prevent emptying of said transmit buffer.

24. A method for interconnecting a first device exhibiting a two way alternate protocol and a second device, said method comprising the steps of:
 transferring data from a receive buffer to said first device via a first communication link according to said two way alternate protocol;
 transferring data from a transmit buffer to said second device via a second communication link; and
 monitoring a fill level of said transmit buffer and when said transmit buffer empties to a predetermined level, halting the transfer of data from said receive buffer to said first device even though said receive buffer has additional data to transfer to said first device, and transferring data from said first device to said transmit buffer to prevent said transmit buffer from becoming empty.

25. A communications adapter for interconnecting first and second devices, said communications adapter comprising:
 a transmit buffer for storing data received from said first device for transmission to said second device;
 a receive buffer for storing data received from said second device for transmission to said first device;
 first, two way alternate communication means for transferring data between said transmit and receive buffers and said first device;
 second communication means for transferring data between said transmit and receive buffers and said second device; and
 means, responsive to a fill level of said receive buffer, for controlling said first communication means to halt transfer of data from said first device to said transmit buffer before said receive buffer fills with data from said second device, even though said first device has additional data to transfer to said transmit buffer, and transfer data from said receive buffer to said first device to make room in said receive buffer for additional data from said second device.

26. A communications adapter as set forth in claim 25 wherein said first communication means is capable of transferring data faster between said transmit and receive buffers and said first device than said second communication means is capable of transferring data between said transmit and receive buffers and said second device.

27. A communications adapter for interconnecting first and second devices, said communications adapter comprising:
 a transmit buffer for storing data received from said first device for transmission to said second device;
 a receive buffer for storing data received from said second device for transmission to said first device;
 first, two way alternate communicating means for transferring data between said transmit and receive buffers and said first device;
 second communicating means for transferring data between said transmit and receive buffers and said second device; and
 means, responsive to a fill level of said transmit buffer, for controlling said first communicating means to halt transfer of data from said receive buffer to said first device before said transmit buffer empties due to transfer of data from said transmit buffer to said second device, even though said receive buffer has additional data to transfer to said first device, and transfer data from said first device to said transmit buffer to prevent emptying of said transmit buffer.

28. A communications adapter as set forth in claim 27 wherein said first communicating means is capable of transferring data faster between said transmit and receive buffers and said first device than said second communicating means is capable of transferring data between said transmit and receive buffers and said second device.

* * * * *